United States Patent Office 3,026,312
Patented Mar. 20, 1962

3,026,312
CATALYSTS CONTAINING ALKALI METAL SALTS FOR OLEFIN POLYMERIZATION
Hugh John Hagemeyer, Jr., Vernon Kee Park, and Marvin B. Edwards, Longview, Tex., assignors to Eastman Kodak Company, Rochester, N.Y., a corporation of New Jersey
No Drawing. Filed Oct. 1, 1959, Ser. No. 843,628
14 Claims. (Cl. 260—93.7)

This invention relates to a new and improved process for the polymerization of olefinic hydrocarbons. In one aspect, this invention relates to a novel catalyst combination for preparing high molecular weight, solid polyolefins, such as polypropylene of high density and crystallinity. In another aspect, this invention relates to the preparation of polymers of propylene and its higher homologs using a particular catalyst combination which has unexpected catalytic activity and which results in polymeric products characterized by unusually high crystallinity.

Polyethylene has been prepared by high pressure procedures to produce relatively flexible polymers having a rather high degree of chain branching and a density considerably lower than the theoretical density. Thus, pressures of the order of 500 atmospheres and higher and usually of the order of 1,000 to 1,500 atmospheres are commonly employed in such procedures. It has been found that more dense polyethylene can be produced with certain catalyst combinations to give polymers which have relatively little chain branching and a high degree of crystallinity. The exact reason why certain catalyst combinations give these polymers of high density and high crystallinity is not fully understood. Furthermore, the activity of the catalysts ordinarily depends upon certain specific catalyst combinations, and the results are ordinarily highly unpredictable since relatively minor changes in the catalyst combination often lead to liquid polymers rather than the desired solid polymers.

Among the catalysts that have been employed to polymerize ethylene to solid crystalline polymers are combinations that include organo-aluminum compounds, such as trialkyl aluminum compounds and alkyl aluminum halide compounds in conjunction with certain inorganic halides. Thus, triethyl aluminum in conjunction with titanium tri- or tetrachloride catalyzes a polymerization reaction for the production of crystalline polyethylene. Similarly, catalytic mixtures of ethyl aluminum sesquichloride in conjunction with titanium trichloride can be used to polymerize ethylene to solid crystalline polymer. However, when the above catalytic mixtures are used for the polymerization of propylene and higher α-olefins the product contains substantial amounts of oils and rubbers in addition to the high molecular weight crystalline polymer. When triethyl aluminum and titanium trichloride are employed to polymerize propylene the product is 15–20 percent oils, rubbers, and low molecular weight crystalline polymer. When a mixture of ethyl aluminum sesquichloride and titanium trichloride are employed to polymerize propylene only 60–65 percent crystalline polymer is formed.

It has now been found that the formation of oils, rubbers and waxes can be reduced and the molecular weight of the crystalline polymer increased by the addition of a unique catalyst component. This third component is particularly unique in that the prior art would lead one to believe that this type of compound would destroy the catalyst. It was truly an unexpected result when we found that this particular class of third components not only did not deactivate catalytic mixtures of alkyl aluminums and alkyl aluminum halides with the transition element halides, but actually increased the stereospecificity of the catalytic mixture. In addition to reducing and indeed substantially eliminating the formation of oils and rubbers, a higher molecular weight crystalline polymer is obtained for a given reaction temperature.

The economic advantages of the catalysts used in our process are two fold. Since the poly-alpha olefins produced by our process are substantially completely crystalline no extraction of the gross polymer is required. The formation of higher molecular weight polymers for a given polymerization temperature permits the use of higher temperatures with the attendant higher space time yields.

It is an object of this invention to provide a novel and improved process for the polymerization of α-monoolefinic hydrocarbons to form solid, crystalline products.

It is another object of this invention to provide a novel and improved process for the polymerization of propylene and higher α-monoolefinic hydrocarbons to produce solid, crystalline products of higher molecular weight.

It is another object of this invention to provide novel catalyst combinations which have unexpected catalytic activity for the polymerization of α-monoolefinic hydrocarbons to form solid, crystalline polymers. Other objects of this invention will be readily apparent from the detailed disclosure.

The above and other objects of this invention are accomplished by means of this invention wherein α-monoolefinic hydrocarbons either singly or in admixture are readily polymerized to high molecular weight, solid, crystalline polymers by effecting the polymerization in the presence of a catalyst composition comprising (1) a halide of a transition metal selected from the group consisting of titanium, zirconium, vanadium, chromium and molybdenum; (2) an alkali metal salt having the formula $M(CH_2)_nCOOM$ wherein each M is an alkali metal selected from the group consisting of sodium, potassium and lithium and $n$ is an integer from 1 to 4 and (3) an organo-aluminum halide having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine, and $m$ and $n$ are integers whose sum is equivalent to the valence of aluminum.

The transition metal halide components of our catalyst system comprise the chlorides or bromides of a transition metal selected from the group consisting of titanium, vanadium, zirconium, chromium and molybdenum. The transition metal halides can be used at their maximum valence, and if desired, a reduced valency form of the halide can be employed. It is preferred to use the titanium chlorides which may be in the form of titanium tetrachloride, titanium trichloride and titanium dichloride. Examples of other metal halides that can be employed are titanium tetrabromide, titanium tribromide, zirconium tetrachloride, zirconium tribromide, vanadium trichloride, molybdenum pentachloride and chromium tribromide.

The catalytic mixture employed in practicing our invention also contains an alkali metal salt of a lower aliphatic carboxylic acid containing two atoms of alkali metals. The preferred salt is sodio-sodium acetate. However, similar salts of other acids, such as propionic acid, butyric acid, valeric acid, and the like can be used. Similarly, the salts can contain alkali metals other than sodium, such as potassium and lithium.

In addition to the transition metal halide and metal salt our catalyst composition contains an organo-aluminum compound, such as ethyl aluminum dichloride, cyclohexyl aluminum dichloride, cyclobutyl aluminum dibromide, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like.

The inventive process is carried out in liquid phase in an inert organic liquid and preferably an inert liquid hydrocarbon vehicle, but the process can be carried out in the absence of an inert diluent. The process proceeds with excellent results over a temperature range of from 50° C. to 150° C., although it is preferred to operate within the range of from about 50° C. to about 90° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing ethylene and mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired.

The novel catalysts described above are quite useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The limiting factor in the temperature of the process appears to be the decomposition temperature of the catalyst. Ordinarily, temperatures from 50° C. to 150° C. are employed, although temperatures in the range of 50° C. to 90° C. are preferred. Usually, it is not desirable or economical to effect the polymerization at temperatures below 50° C., and the process can be readily controlled at temperatures not substantially above room temperature which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. Higher concentrations of monomer ordinarily increase the rate of polymerization and with propylene, butene-1, and higher alpha olefins the polymerization can be carried out in the liquid olefin.

The preferred molar ratio of transition metal halide to aluminum compound in our catalyst is within the range of 1:0.5 to 1:6, and the preferred molar ratio of metal salt to aluminum compound in our catalyst is within the range of 1:0.2 to 1:6, but it will be understood that higher and lower molar ratios are within the scope of this invention. A particularly effective catalyst contains three moles of transition metal compound, 0.5 moles of metal salt and two moles of aluminum dihalide. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well-known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect lower molecular weights and higher reaction rates by operating at elevated temperatures. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

EXAMPLE 1

A catalyst for propylene polymerization was prepared by adding 8.58 g. of titanium trichloride (.055 mole) to 9.08 g. of ethyl aluminum sesquichloride (.033 mole) and intimately mixing at 30° C. to insure complex formation. To this mixture was added 30 ml. of mineral spirits followed by 0.95 g. of alpha-sodio sodium acetate (.009 mole) and intimate mixing continued to insure complex formation. The catalyst complex was then charged to a 2-liter stirred autoclave in 560 ml. of mineral spirits, and propylene was polymerized at 85° C. and 1000 p.s.i.g. The polymer was washed successively with hot isobutanol to remove the catalyst and dried in vacuo at 80° C. The yield was 310 g. of polypropylene with a crystallinity of 95.5 percent by hexane extraction; melt index, 0.365; inherent viscosity in tetralin at 145° C., 2.23.

EXAMPLE 2

The improved results which can be obtained in propylene polymerization by addition of alpha-sodio sodium acetate to ethyl aluminum sesquichloride-titanium trichloride catalysts are illustrated by comparing Example 1 with the following run in which the alpha-sodio sodium acetate was omitted. Ethyl aluminum sesquichloride 9.08 g. was dissolved in 30 ml. of mineral spirits and 8.58 g. of titanium trichloride was added. This catalyst mixture was stirred at room temperature for 1 hour and then charged together with 500 ml. of mineral spirits to a nitrogen-filled 2-liter stirred autoclave. Polymerization was carried out for 12 hours at 84° C. under a propylene pressure of 1000 p.s.i. The polypropylene which was formed, after being freed from catalyst residues by washing with methanol, amounted to 35 grams. The melt index of this product was 2.51, and the inherent viscosity was 1.55.

EXAMPLE 3

A catalyst complex was made by adding 8.6 g. of vanadium trichloride to 9.08 g. of ethyl aluminum sesquichloride and then adding 1.91 g. of alpha-sodio sodium acetate to give a mole ratio of ethyl aluminum sesquichloride to alpha-sodio sodium acetate to titanium trichloride of 2:1:3. This catalyst was charged to a 2-liter stirred autoclave in 500 ml. of mineral spirits and pressured to 1000 p.s.i. with propylene at 90° C. Reaction was continued for 2 hours. The polymer was washed free of catalyst residues with hot isobutanol and dried in vacuo at 80° C. A yield of 225 g. of polypropylene having a residual ash of less than 0.02 percent, inherent viscosity of 2.0, melt index 0.410 and percent crystallinity of 96.8 was obtained.

EXAMPLE 4

The following polymerizations were carried out at 80° C. and 1000 p.s.i.g. with propylene in 1500 ml. of mineral spirits using 0.055 gram mole (8.58 g.) of titanium trichloride and an amount of an aluminum alkyl or alkyl aluminum halide to give Al/Ti=1.

Table 1

| Aluminum Compound | Gram Mole NaOOCCH$_2$Na | Percent Cystallinity | Inherent Viscosity |
|---|---|---|---|
| $(C_2H_5)_3Al$ | | 82 | 2.62 |
| $(C_2H_5)_2Al$ | .01 | 98 | 3.67 |
| $(C_2H_5)_3Al_2Cl_3$ | | 69 | 1.55 |
| $(C_2H_5)_3Al_2Cl_3$ | .01 | 96 | 2.23 |
| $(C_2H_5)_3Al_2Cl_3$ | .02 | 99 | 2.81 |
| $C_2H_5AlCl_2$ | .02 | 88 | 2.15 |

The use of the catalyst composition of this invention in olefin polymerization reactions offers several valuable advantages over prior art procedures. With our catalyst, it is possible to direct the polymerization of the olefinic monomers almost exclusively to the desired highly crystalline high molecular weight polyolefin by the proper choice of mole ratios of catalyst components and by using efficient catalyst mixing techniques. With our catalyst the formation of less valuable oils and rubbery low molecular weight amorphous polymers can be virtually eliminated. Additionally, by the use of our catalyst composition, rapid polymerization rates can be achieved. By using the metal salt component in our catalyst composition, an acceleration in the reaction rate can be realized by a comparison with the reaction rates that have been obtainable with similar catalyst compositions that do not contain the metal salt component. Further, the metal salt component of our catalyst composition can be employed advantageously to obtain highly desirable results without poisoning the catalyst itself. Other components have been suggested for addition to catalyst compositions such as ours, but in many instances these components tend to poison the catalyst although they may be effective for improving the polymerization reaction rate per unit of reactor space for a given unit of time.

In preparing our catalyst composition for use in the polymerization reaction, it is important that the aluminum compound and the transition metal halide be permitted to react and to form a complex before the metal salt is added to the catalyst composition. To achieve optimum results in the process of our invention, we react the aluminum compound and the transition metal halide in the pure state or in concentrated solutions to form a complex and then the metal salt is added to the catalyst composition. After the metal salt has been added to the catalyst composition the catalyst is activated by stirring the mixture at temperatures within the range of 20 to 110° C., the temperature of mixing varying inversely with the time of mixing until the catalyst composition is ready to be charged to the polymerization reactor. In some intances, it is desirable to wash the catalyst composition with pure solvent until the wash liquid is free of unreacted and soluble halides. Removal of impurities from the catalyst complex is desirable for realization of optimum results in our process.

Thus, by means of this invention polyolefins such as polyethylene, polypropylene and polymers of higher molecular weight hydrocarbons are readily produced using a catalyst combination whose activity, based on the knowledge of the art, could not have been predicted. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of $\alpha$-monoolefins. These catalyst compositions can, however, be used for polymerizing other $\alpha$-olefins, and it is not necessary to limit the process of the invention to monoolefins. Diolefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. The process for producing solid high molecular weight polyhydrocarbons which comprises polymerizing $\alpha$-monoolefinic hydrocarbon containing 3 to 10 carbon atoms in an inert normally liquid hydrocarbon solvent in the presence of a catalyst composition comprising a titanium halide, an alkyl aluminum sesquihalide and sodio-sodium acetate the molar ratio of sodio-sodium acetate to alkyl aluminum sesquihalide being within the range of 1:0.2 to 1:6.

2. The process for producing solid, high molecular weight polypropylene which comprises polymerizing propylene in an inert normally liquid hydrocarbon solvent in the presence of a catalyst comprising a titanium halide, an alkyl aluminum sesquihalide and sodio-sodium acetate the molar ratio of sodio-sodium acetate to alkyl aluminum sesquihalide being within the range of 1:0.2 to 1:6.

3. The process for producing solid, high molecular weight polypropylene which comprises polymerizing propylene in an inert normally liquid hydrocarbon solvent and in the presence of a catalyst comprising titanium trichloride, ethyl aluminum sesquichloride and sodio-sodium acetate the molar ratio of sodio-sodium acetate to ethyl aluminum sesquichloride being within the range of 1:0.2 to 1:6

4. The process according to claim 3 wherein the catalyst is prepared by reacting titanium trichloride and ethyl aluminum sesquichloride and then adding sodio-sodium acetate.

5. The process according to claim 4 wherein unreacted catalyst components are removed from the catalyst prior to use of the catalyst in the polymerization reaction.

6. As a composition of matter, a catalyst for the polymerization of propylene to solid, high molecular weight polymer comprising a titanium halide, an alkyl aluminum sesquihalide and sodio-sodium acetate the molar ratio of sodio-sodium acetate to alkyl aluminum sesquihalide being within the range of 1:0.2 to 1:6.

7. As a composition of matter, a catalyst for the polymerization of propylene to solid, high molecular weight polymer comprising titanium trichloride, ethyl aluminum sesquichloride and sodio-sodium acetate the molar ratio of sodio-sodium acetate to ethyl aluminum sesquichloride being within the range of 1:0.2 to 1:6.

8. The method for preparing a catalyst for the polymerization of propylene to solid, crystalline polymer which comprises reacting a titanium halide with an alkyl aluminum sesquihalide and then adding sodio-sodium acetate to the reaction mixture the molar ratio of sodio-sodium acetate to alkyl aluminum sesquihalide being within the range of 1:0.2 to 1:6.

9. The method for preparing a catalyst for the polymerization of propylene to solid, crystalline polymer which comprises reacting titanium tetrachloride with ethyl aluminum sesquichloride and then adding sodio-sodium acetate to the reaction mixture the molar ratio of sodio-sodium acetate to ethyl aluminum sesquichloride being within the range of 1:0.2 to 1:6.

10. The method according to claim 9 wherein the catalyst composition is activated by heating to a temperature within the range of 20 to 110° C.

11. The method according to claim 9 wherein unreacted catalyst components are removed from the catalyst composition.

12. The process for producing solid, high molecular weight polyhydrocarbons which comprises polymerizing $\alpha$-monoolefinic hydrocarbons containing 3 to 10 carbon atoms in the presence of a catalyst composition comprising (1) a halide of a transition metal selected from the group consisting of titanium and vanadium, (2) a sodium salt having the formula $Na(CH_2)_nCOONa$ wherein $n$ is an integer from 1 to 4 and (3) an organoaluminum halide selected from the group consisting of $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum, the amount of sodium salt in said catalyst composition being sufficient to increase the crystallinity of the high molecular weight polyhydrocarbon produced in the process.

13. As a composition of matter, a catalyst for the polymerization of $\alpha$-monoolefinic hydrocarbon containing 3 to 10 carbon atoms to solid high molecular weight polymer comprising (1) a halide of a transition metal selected from the group consisting of titanium and vanadium, (2) a sodium salt having the formula $Na(CH_2)_nCOONa$ wherein $n$ is an integer from 1 to 4 and (3) an organoaluminum halide selected from the group consisting of $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum, the amount of sodium salt in said catalyst composition being sufficient to increase the crystallinity of the high molecular weight polyhydrocarbon produced in the process.

14. The method for preparing a catalyst composition for the polymerization of $\alpha$-monoolefinic hydrocarbon to solid polymer which comprises reacting a halide of a transition metal selected from the group consisting of titanium and vanadium with an organoaluminum halide selected from the group consisting of $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and then adding a sodium salt having the formula $Na(CH_2)_nCOONa$, wherein $n$ is an integer from 1 to 4 to the reaction mixture, the amount of sodium salt in said catalyst composition being sufficient to increase the crystallinity of the solid polymer produced in said polymerization.

References Cited in the file of this patent

UNITED STATES PATENTS

| | | |
|---|---|---|
| 2,862,917 | Anderson et al. | Dec. 2, 1958 |
| 2,867,612 | Pieper et al. | Jan. 6, 1959 |
| 2,899,415 | Truett et al. | Aug. 11, 1959 |

FOREIGN PATENTS

| | | |
|---|---|---|
| 526,101 | Italy | Nov. 14, 1955 |